US007281240B1

(12) United States Patent
Cantrill

(10) Patent No.: US 7,281,240 B1
(45) Date of Patent: Oct. 9, 2007

(54) MECHANISM FOR LOSSLESS, LOCK-FREE BUFFER SWITCHING IN AN ARBITRARY-CONTEXT TRACING FRAMEWORK

(75) Inventor: Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 768 days.

(21) Appl. No.: 10/713,652

(22) Filed: Nov. 14, 2003

(51) Int. Cl.
  G06F 9/44   (2006.01)
  G06F 11/00  (2006.01)
  G06F 12/00  (2006.01)

(52) U.S. Cl. .......................... 717/128; 714/34; 714/45; 712/229; 711/156

(58) Field of Classification Search ................. 717/128
See application file for complete search history.

(56) References Cited

U.S. PATENT DOCUMENTS

| | | | | |
|---|---|---|---|---|
| 5,481,684 | A * | 1/1996 | Richter et al. | 712/212 |
| 5,893,165 | A * | 4/1999 | Ebrahim | 711/158 |
| 6,083,281 | A * | 7/2000 | Diec et al. | 717/128 |
| 6,584,586 | B1 * | 6/2003 | McCoy | 714/45 |
| 6,615,342 | B1 * | 9/2003 | Bopardikar et al. | 712/227 |
| 6,615,370 | B1 * | 9/2003 | Edwards et al. | 714/45 |
| 6,732,307 | B1 * | 5/2004 | Edwards | 714/724 |
| 6,848,046 | B2 * | 1/2005 | Zimmer | 713/100 |
| 6,901,581 | B1 * | 5/2005 | Schneider | 717/124 |
| 6,952,664 | B1 * | 10/2005 | Lahiri et al. | 703/14 |
| 7,143,311 | B2 * | 11/2006 | Haydock | 714/25 |
| 2002/0199172 | A1 * | 12/2002 | Bunnell | 717/128 |
| 2003/0056205 | A1 * | 3/2003 | Li et al. | 717/128 |
| 2003/0084375 | A1 * | 5/2003 | Moore et al. | 714/34 |
| 2003/0135787 | A1 * | 7/2003 | DeWitt et al. | 714/30 |
| 2004/0193945 | A1 * | 9/2004 | Eguchi et al. | 714/6 |
| 2005/0160406 | A1 * | 7/2005 | Duncan et al. | 717/127 |

OTHER PUBLICATIONS

Erlichson, A., Nuckolls, N., Chesson, G., and Hennessy, J. 1996. SoftFLASH: analyzing the performance of clustered distributed virtual shared memory. In Proc. of the 7th intl Conf. on Architectural Support For Prog. Lang. and Operating Systems (Cambridge, Massachusetts, United States, Oct. 01-04, 1996). ASPLOS-VII. ACM Press, 210-220.*

(Continued)

Primary Examiner—Tuan Dam
Assistant Examiner—Derek J. Rutten
(74) Attorney, Agent, or Firm—Osha Liang LLP

(57) ABSTRACT

A method for tracing on a processor including executing an executing control block on the processor to obtain data, wherein an interrupt on the processor is disabled prior to executing the execution control block and the interrupt is enabling after execution of the execution control block is completed, storing the data in a first buffer, wherein the first buffer is set to active, and setting the first buffer to inactive and setting a second buffer to active, wherein the interrupt on the processor is disabled prior to switching the first buffer to inactive and the interrupt is enabling after setting the second buffer to active.

22 Claims, 8 Drawing Sheets

OTHER PUBLICATIONS

Cantrill et al. "Dynamic Instrumentation of Production Systems", Jul. 2, 2004, Usenix Association, Proceedings of the General Track: 2004 USENIX Annual Technical Conference, pp. 15-28.*

Tamches, Ariel and Miller, Barton P. Fine-Grained Dynamic Instrumentation of Commodity Operating System Kernels [Online] http://www.usenix.org/publications/library/proceedings/osdi99/full_papers/tamches/tamches.pdf, Published Feb. 1999.

Murayama, John. Performance Profiling Using TNF, [Online] http://developers.sun.com/solaris/articles/tnf.html, Jul. 2001.

Lorch, Jacob R. and Smith, Alan J. The VTrace Tool: Building a system Tracer for Windows NT and Windows 2000. [Online] http://msdn.microsoft.com/msdnmag/issues/1000/VTtrace/default.aspx, Oct. 2000.

Chapter 10, The Generalized Trace Facility (GTF), [Online] http://publib.boulder.ibm.com/cgi-bin/bookmgr/BOOKS/IEA2V100/CCONTENTS, Jan. 2001.

Mirgorodskii, Alex. The Path to Portable Kernel Instrumentation: The Kerninst API. http://www.dyninst.org/mtg2003/slides/KerninstAPI.pdf, Apr. 2003.

Richard Moore, et al. IBM Dynamic Probes http://www-124.ibm.com/developerworks/opensource/linux/projects/dprobes/README, 2000.

K. Yaghmour et al.; "Measuring and Characterizing System Behavior Using Kernel-Level Event Logging"; Proceeding of the 2000 USENIX Annual Technical Conference; Jun. 18-23, 2000, San Diego, California, USA.

* cited by examiner

MECHANISM FOR LOSSLESS, LOCK-FREE BUFFER SWITCHING IN AN ARBITRARY-CONTEXT TRACING FRAMEWORK

BACKGROUND

Analyzing the dynamic behavior and performance of a complex software system is difficult. Typically, analysis of a software system is achieved by gathering data at each system call and post-processing the data. The following is a brief description of conventional tracing frameworks.

The conventional tracing frameworks were typically composed of various independent software modules. The primary source of information accessed by the conventional tracing frameworks is the kernel. The conventional tracing frameworks typically include a trace facility, a trace module, a daemon, and an offline data analysis and processing component. The trace facility gathers information from various components of the kernel and forwards events to the trace module. The trace module subsequently logs the events in its buffer. Periodically, the trace daemon reads the events from the trace module buffer and commits the recorded events into a user-provided file.

The trace facility is an extension to the core kernel facilities. The trace facility provides a unique entry point to all of the other kernel facilities requesting or requiring that an event be traced. Such events are not logged, but instead, the trace request is forwarded to the trace module. If the trace module is compiled as part of the kernel, then the trace module achieves this functionality by registering itself with the trace facility upon system startup. Otherwise, if the trace module is compiled and loaded as a separate module, then the registration takes place when the trace module is loaded.

During the registration process, the trace module provides the trace facility with a call-back function that is called whenever an event occurs. If no trace module is registered, then the traced events are ignored. Furthermore, the registration process provides the trace module with the ability to configure the manner in which the instruction pointer values are recorded upon the occurrence of a system call. Once configured, the kernel browses the stack to find an instruction pointer matching the desired constraints, whenever a system call occurs. In summary, the kernel trace facility acts as a link between the trace module and the different kernel facilities.

The trace module stores the incoming event descriptions and delivers them efficiently to the daemon. More specifically, the trace module retrieves additional information for each event occurring in the kernel. This additional information includes the time at which the event occurred and the CPU identifier for the event. To efficiently deal with the large quantity of data stored by the trace module, the trace module typically uses a double-buffering scheme where a write buffer is used to log events until a threshold limit is reached. When the threshold limit is reached, the daemon is notified. Once the write buffer has been filled (or the threshold is reached), the trace module assigns the current buffer as the read buffer and uses the previous read buffer as the new write buffer. The daemon subsequently retrieves the data from the current read buffer.

The primary function of the daemon is to retrieve and store the information accumulated by the trace module, typically in a file. The daemon provides the user with a number of options to control the tracing process. In addition to giving the user access to the options available from the trace module, the daemon allows the user specify the tracing duration. Once the daemon is launched, the daemon opens and configures the trace module, and sets a timer if a time duration was specified. Otherwise, the user terminates the daemon process manually to stop the trace.

During normal operation, the daemon typically sleeps, awaiting a signal to read from the trace module, or timer/terminate events to end tracing. Similar to the trace module, the daemon uses double buffering. When the daemon receives a signal from the trace module, the daemon reads the content of the buffer denoted as the read buffer and appends the content to the content in an associated internal buffer (not shown). Once the internal buffer is full, the contents of the internal buffer is committed to a file and, during this process, a second internal buffer is used to record the incoming data.

To enable processing of the event data, conventional tracing frameworks typically require the state information for the software system state prior to performing the trace. Specifically, the daemon reviews one or more system directories and records the following characteristics for each process: 1) process ID; 2) name; and 3) parent's process ID. The state information is typically retrieved after the configuration of the trace module and prior to the start of the trace. The information retrieved is stored in a file that is later used by the analysis software. Unlike the aforementioned components of the conventional tracing framework described above, the data analysis and presentation software is typically run off-line. The software uses both the initial process state and the trace data files created by the daemon to recreate the dynamic behavior of the system in a particular, observed time interval. Collating and sorting utilities with the software are used to display the stored information at the user-level.

SUMMARY

In general, in one aspect, the invention relates to a method for tracing on a processor comprising executing an executing control block on the processor to obtain data, wherein an interrupt on the processor is disabled prior to executing the execution control block and the interrupt is enabling after execution of the execution control block is completed, storing the data in a first buffer, wherein the first buffer is set to active, and setting the first buffer to inactive and setting a second buffer to active, wherein the interrupt on the processor is disabled prior to switching the first buffer to inactive and the interrupt is enabling after setting the second buffer to active.

In general, in one aspect, the invention relates to a system for tracing on a processor, comprising a first buffer, wherein the first buffer is set to active, a second buffer, wherein the second buffer is set to inactive, an execution control block associated with a probe configured to obtain data from the probe, and a tracing framework configured to store the data in the first buffer and configured to set the first buffer to inactive and the second buffer to active, wherein the tracing framework is configured to issue a cross-call prior to setting the first buffer to inactive and the second buffer to active.

In general, in one aspect, the invention relates to a network system having a plurality of nodes, comprising a processor, a first buffer associated with the processor, wherein the first buffer is set to active, a second buffer associated with the processor, wherein the second buffer is set to inactive, an execution control block associated with a probe configured to obtain data from the probe, and a tracing framework configured to store the data in the first buffer and configured to set the first buffer to inactive and the second buffer to active, wherein the tracing framework is configured to issue a cross-call prior to setting the first buffer to inactive and the second buffer to active, wherein the processor executes on any node of the plurality of nodes, wherein the first buffer executes on any of the plurality of nodes, wherein the second buffer executes on any of the plurality of nodes, wherein the execution control block executes on any of the plurality of nodes, and wherein the tracing framework executes on any of the plurality of nodes.

Other aspects of the invention will be apparent from the following description and the appended claims.

DETAILED DESCRIPTION

Figure 1:
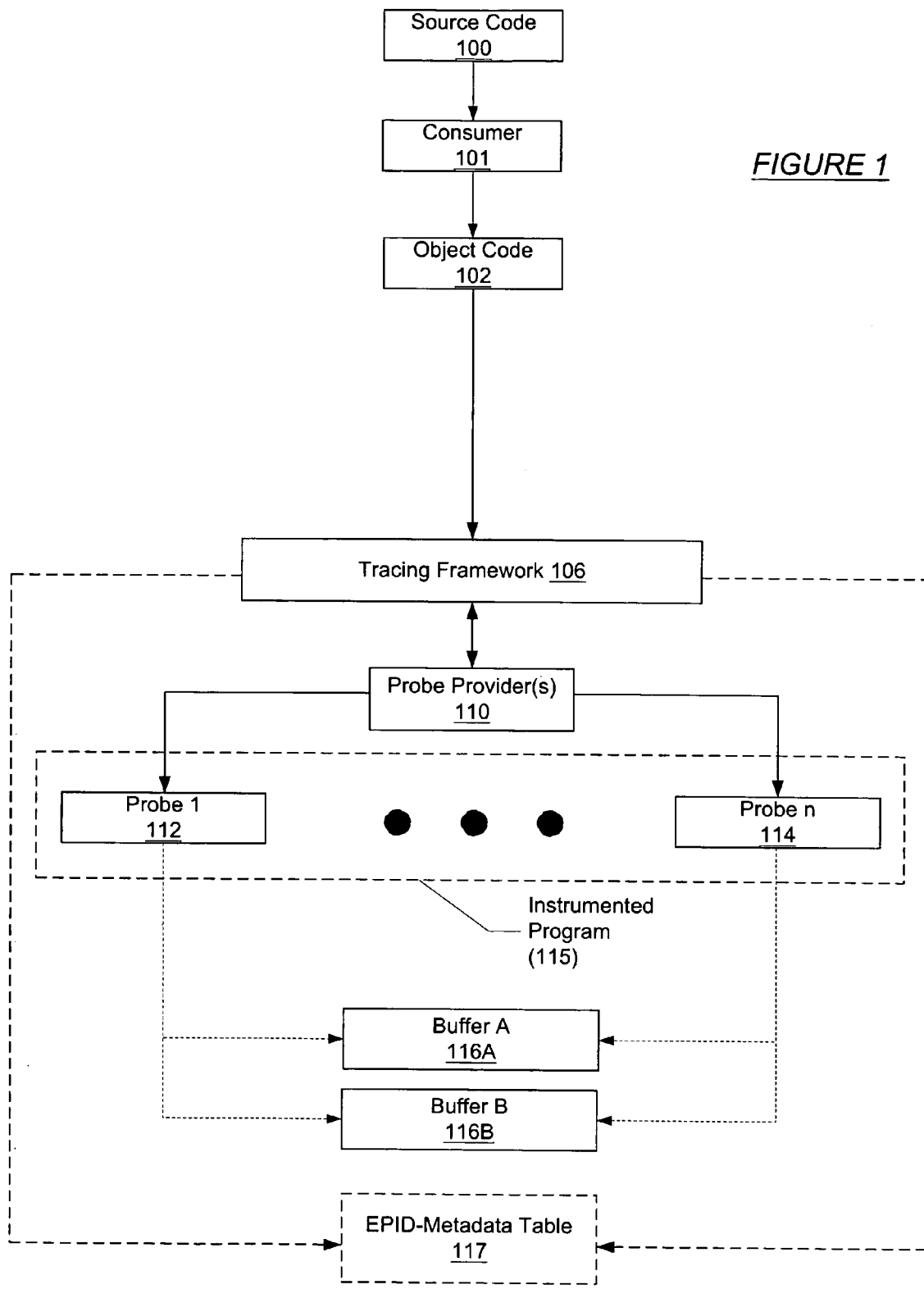
FIG. 1 shows a flow diagram detailing the collection of data in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to a method and apparatus for multiplexing a probe using a tracing framework that supports one or more consumers. Further, the invention relates to method and apparatus for synchronizing a multiplexed probe.

FIG. 1 shows a flow diagram detailing the collection of data in accordance with one embodiment of the invention. Specifically, FIG. 1 provides an overview of the process for collecting data to store in a buffer. Initially, source code (100) is written/obtained/generated that defines a tracing function (i.e., a request to obtain certain data). More specifically, the tracing function defines which probes (112, 114) to enable within the instrumented program (115), and what actions that the tracing framework (106) is to perform when the probes (112, 114) are triggered (i.e., when a program thread executing the instrumented program (115) encounters a probe (112, 114)). In one or more embodiments of the invention, a tracing function may define one or more actions that the tracing framework (106) is to perform when a probe (112, 114) is encountered. Each action defined by the tracing function is identified by an EPID.

The source code (100) is typically associated with a consumer (101). Note that a consumer (101) may define one or more tracing functions. The consumer is a virtual client that sends requests, in the form of tracing functions, to the tracing framework (106) to obtain information about the instrumented program (115). Further, the consumer (101) also retrieves the requested information, which is stored by the tracing framework (106) in the associated buffers (116A, 116B). EPIDs may be defined on a per-consumer basis or on a per-system basis.

If the EIPDs are defined on a per-consumer basis, the EPIDs are only required to uniquely identify an action with respect to other actions defined by the consumer (101). Accordingly, in this embodiment, the data obtained from the probes (112, 114) is typically stored in a per-consumer buffer. If the tracing framework (106) is implemented on a multiprocessor system, then the data obtained from the probes (112, 114) is typically stored in a per-consumer-per CPU buffer. Alternatively, if the EPIDs are defined on a per-system basis, the tracing framework (106) typically includes functionality to uniquely define each action for each consumer such that each action, regardless of the consumer (101) with which it is associated with, may be uniquely identified within the system.

In one embodiment of the invention, the EPID is an integer. Alternatively, the EPID may be represented using any alphanumeric string that is sufficient to identify the corresponding action on a per-consumer or a per-system basis.

Returning to FIG. 1, the source code (100) is subsequently forwarded, via the consumer (101) to a compiler (not shown), where the source code (100) is compiled to generate executable object code (102). The object code (102) is then communicated to a tracing framework (106). The tracing framework (106) includes functionality to execute the object code (102). Specifically, the tracing framework (106) interprets the object code (102) and directs the probe providers (110) to activate certain probes (112, 114) within the instrumented program (115). In addition, the tracing framework (106) may include functionality to associate each action, identified by an EPID, with a probe (112, 114).

Figure 3:
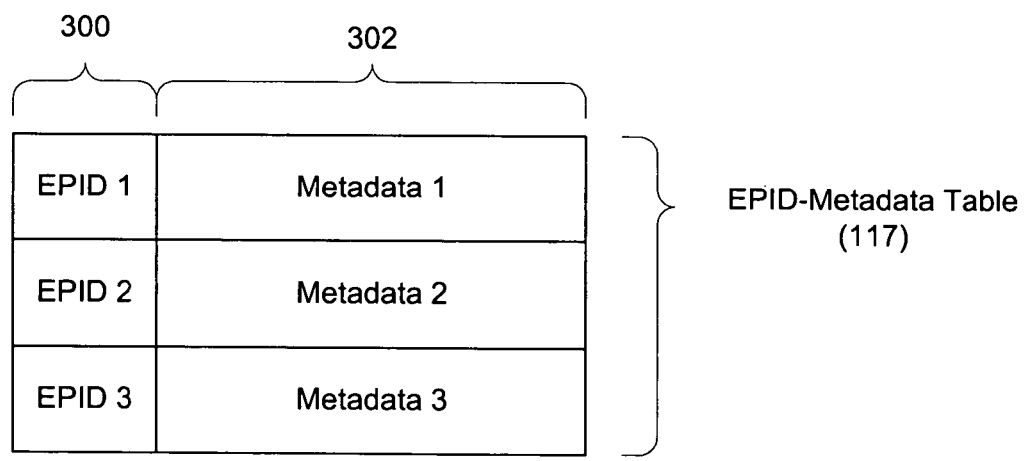
FIG. 3 shows an enabled probe identification ("EPID")-Metadata table layout in accordance with one embodiment of the invention.

In addition, the tracing framework (106) may include functionality to generate and populate an EPID-Metadata table (117) or a corresponding data structure that includes metadata defining the data layout of the data associated with a given EPID. The metadata information may be extracted from the source code (100), the object code (102), or obtained from a combination of data structures within the tracing framework (106). Further, the EPID-Metadata table (117) may be defined statically, or alternatively, the EPID-Metadata may be determine dynamically as required/requested by the tracing framework (106) or the consumer (101). Refer to FIG. 3 below for additional details regarding the EPID-Metadata table (117).

Continuing with the discussion of FIG. 1, the probes (112, 114) gather the specified information from the instrumented program (115), as defined by the object code (102) derived from the actions defined within the source code (100), and forward the information (directly or indirectly) to a corresponding a buffer (e.g., 116A or 116B).

Figure 6:
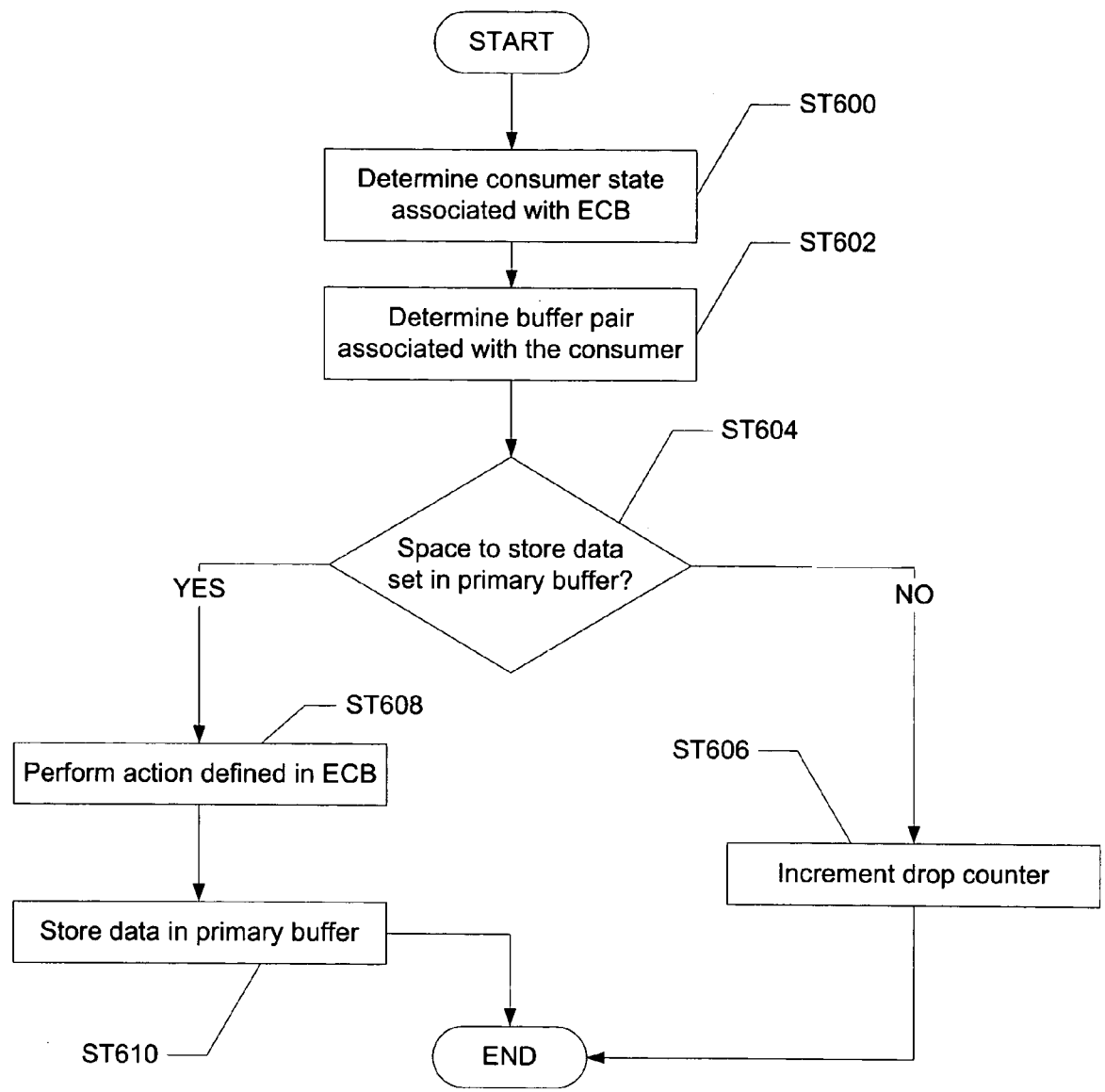
FIG. 6 shows a flowchart in accordance with one embodiment of the invention.
Figure 7:
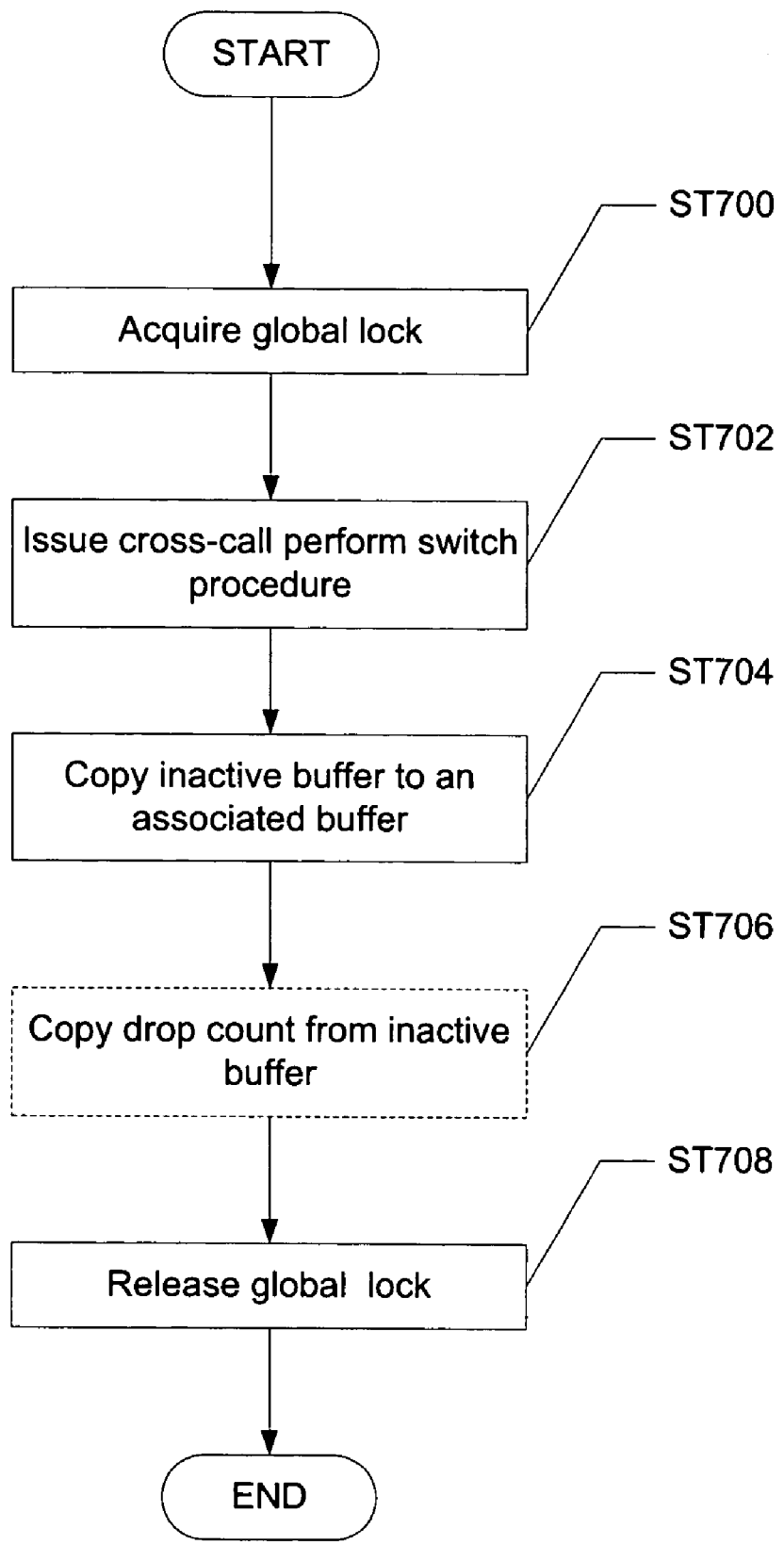
FIG. 7 shows a flowchart in accordance with one embodiment of the invention.
Figure 8:
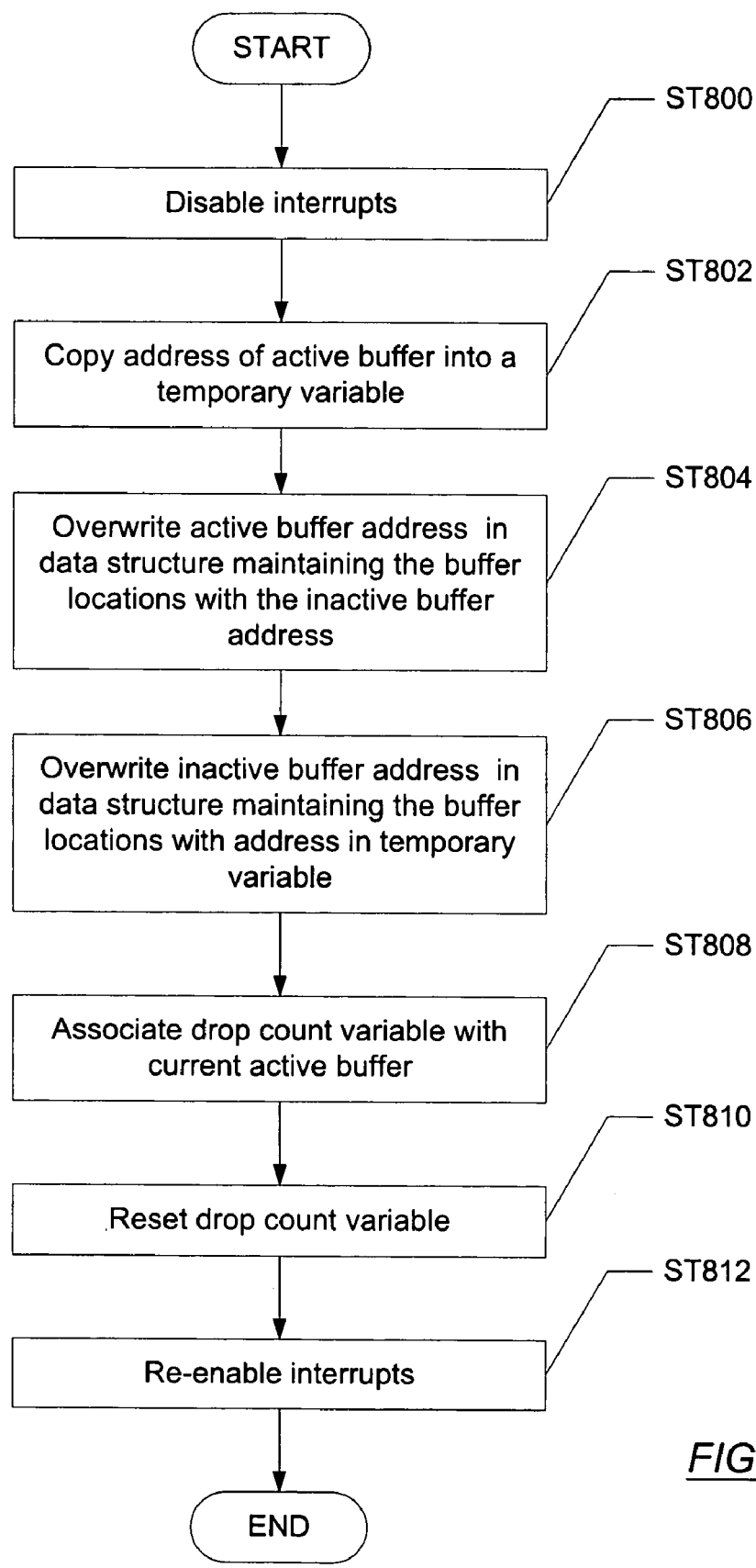
FIG. 8 shows a flowchart in accordance with one embodiment of the invention.

In one embodiment of the invention, the information obtained from the probes (112, 114) is stored in a buffer (e.g., 116A or 116B) denoted as "Active." At certain points during the execution of the instrumented program, tracing framework switches the buffer (e.g., 116A or 116B) currently denoted as "Active" to "Inactive" and sets the buffer (e.g., 116A or 116B) currently denoted as "Inactive" to "Active." The tracing framework (106) then stores information obtained from the probes (112, 114) into the buffer (e.g., 116A or 116B) now denoted as "Active." FIGS. 6-8 provide additional details for switching a buffer (e.g., 116A or 116B) form an "Active" state to an "Inactive" state. In one or more embodiments of the invention, each consumer (101) is associated with a pair of buffers, in which one buffer is denoted as "Active" and the other buffer is denoted as "Inactive." If the tracing framework is operating in a system with multiple CPUs, then each CPU within the system may include a pair of buffers allocated for each consumer (101) executing within the tracing framework (106).

Continuing with the discussion of FIG. 1, the buffer (e.g., 116A or 116B), or a related process analyzes the information and stores the information as a data set. An embodiment of the data set is described below with respect to FIG. 2. In one or more embodiments of the invention, the information gathered from the instrumented program includes the raw data as well as additional ancillary data that is used by the tracing framework to manage the data prior to storing it in a buffer.

Figure 2:
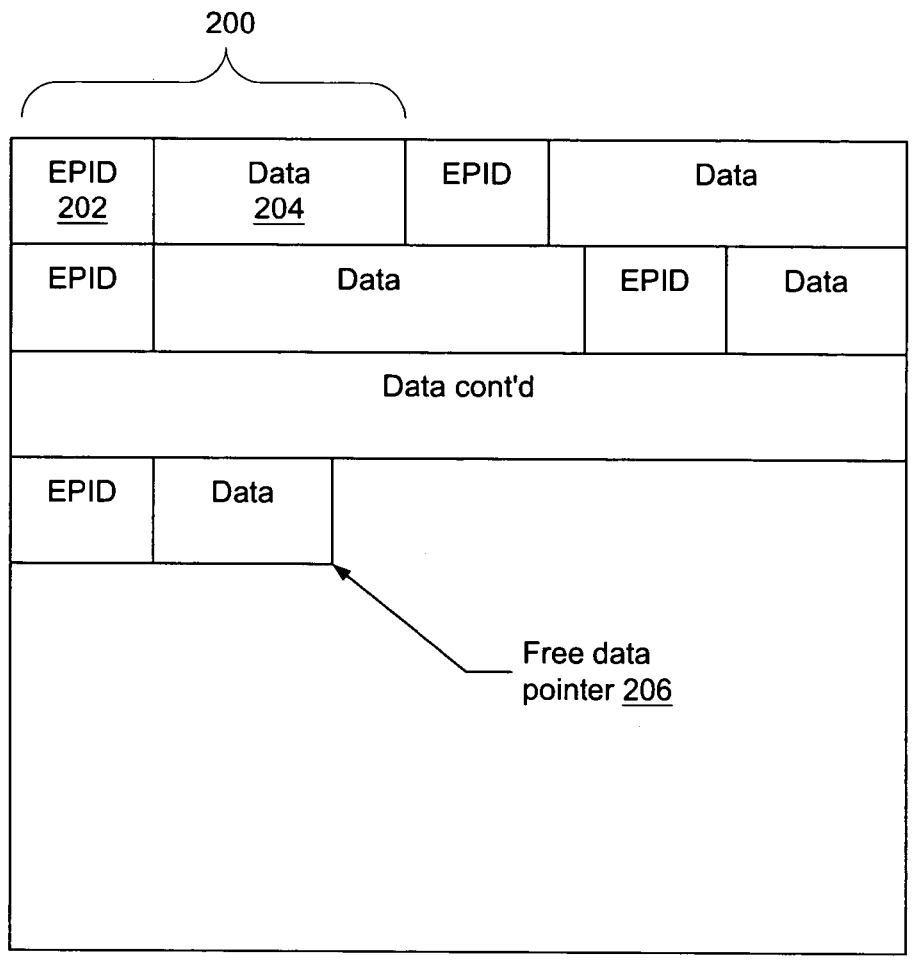
FIG. 2 shows a buffer layout in accordance with one embodiment of the invention.

FIG. 2 shows a buffer layout in accordance with one embodiment of the invention. As mentioned above, the data obtained from the probes (112, 114) is associated with an EPID and subsequently stored in the buffer (116A, 116B). In one embodiment of the invention, the data and associated EPID are stored as a data set (200). The data set (200) includes an EPID (202) component followed by a data (204) component. In one or more embodiments of the invention, the data sets (200) are added to the buffer (116A, 116B) at the current offset (206). Those skilled in the art will appreciate that the data (204) may be of any individual data type or an aggregate data type. Further, the data (204) may be individual pieces of data, or two or more pieces of data concatenated together. The exact composition of the data (204), as well as the layout of the data, is defined by the metadata associated with the EPID (202).

FIG. 3 shows an EPID-Metadata table layout in accordance with one embodiment of the invention. The EPID-Metadata table (117) includes a list of EPIDs (300) and associated metadata (302) defining the data layout of the data (204) associated with the EPID (202) in the buffer (116A, 116B). The metadata (302) may include but is not limited to the enabled probe function, the enabled probe name, the enable probe module, the data size, the data layout, the data type, etc.

Figure 4:
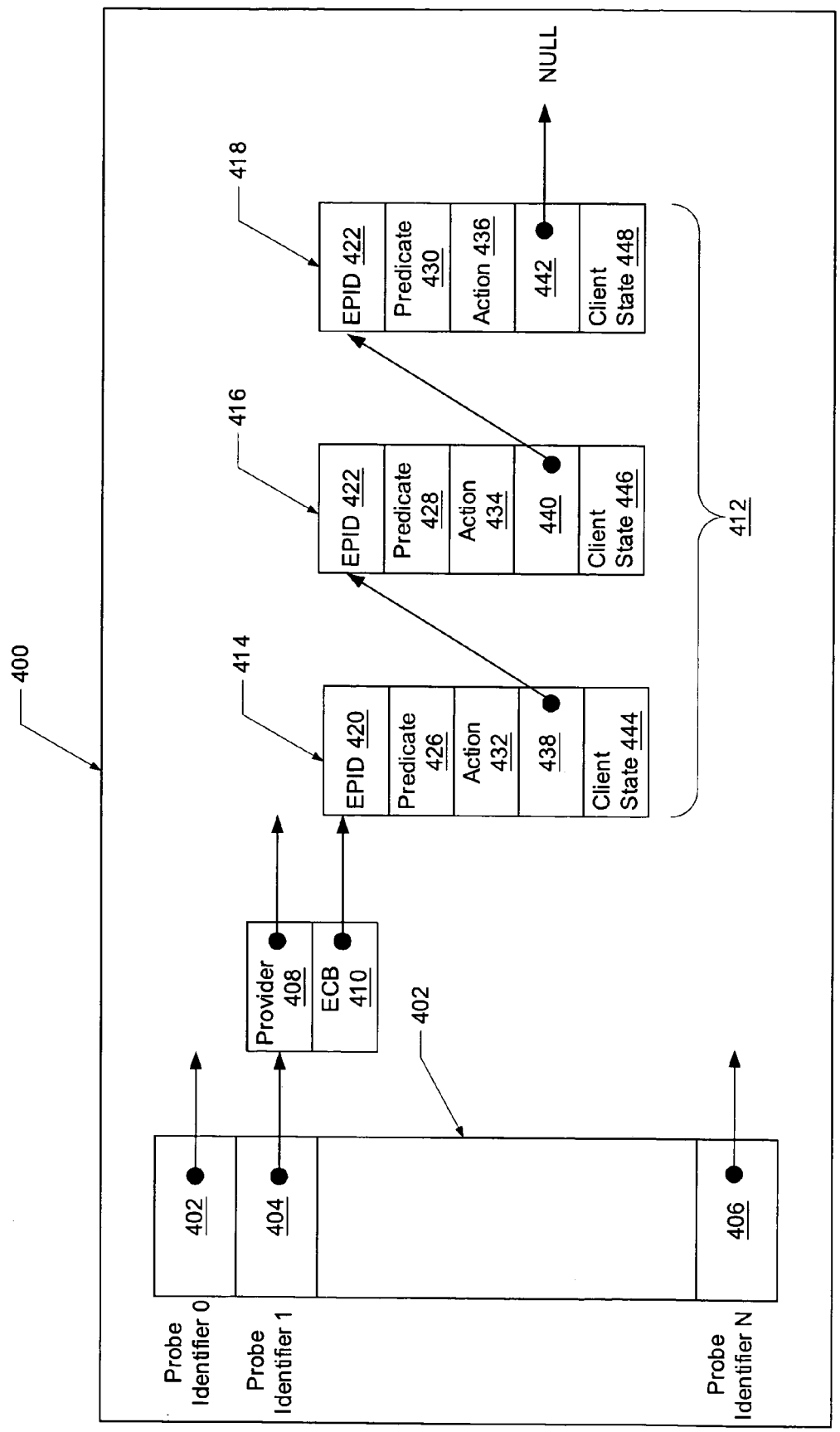
FIG. 4 shows a detailed view of a tracing framework in accordance with one embodiment of the invention.

FIG. 4 shows a detailed view of a tracing framework in accordance with one embodiment of the invention. The tracing framework (106) includes a global array (400) of pointers (402, 404, 406) indexed by probe identifiers (Probe Identifier 0, Probe Identifier 1, Probe Identifier N). As noted above, the instrumented program (115) may include one or more probes (112, 114), and each probe (112, 114) may perform one or more actions, when triggered, as defined by the consumer (101). Each probe (112, 114) is identified using a Probe Identifier (402, 404, 406).

Each pointer (402, 404, 406) in the global array (400) is associated with a pointer (408) to a probe provider that enabled the probe (112, 114). In addition, the pointer (408) is also associated with a pointer (410) to an execution control block ("ECB") data structure (412). In one or more embodiments of the invention, the ECB data structure (412) is a linked list. Each element in the linked list corresponds to an ECB (414, 416, 418).

Conceptually, each ECB (414, 416, 418) corresponds to an action requested by a particular consumer (101) for a particular probe (112, 114). In one embodiment of the invention, each ECB (414, 416, 418) includes an EPID (420, 422, 424) uniquely identifying the ECB (414, 416, 418). Further, each ECB (414, 416, 418) includes a predicate (426, 428, 430) specifying criteria that is to be met prior to executing the associated action (432, 434, 436). In addition, each ECB also includes a consumer state (444, 446, 448) component that provides information about the consumer (101) that is associated with the particular ECB (414, 416, 418). If the ECB (412) data structure is implemented using a linked list data structure, then each ECB (414, 416, 418) also includes a pointer (438, 440) to the next ECB (414, 416, 418) or a pointer (442) to NULL.

Those skilled in the art will appreciate an ECB may be defined to include more components than those described above or to include a subset of the components described above. Further, the information associated within each ECB may reside with each ECB, or alternatively, the information associated with each ECB may be stored in a location remote to the ECB with the each ECB having a pointer (or pointers) to the information associated with the ECB.

Figure 5:
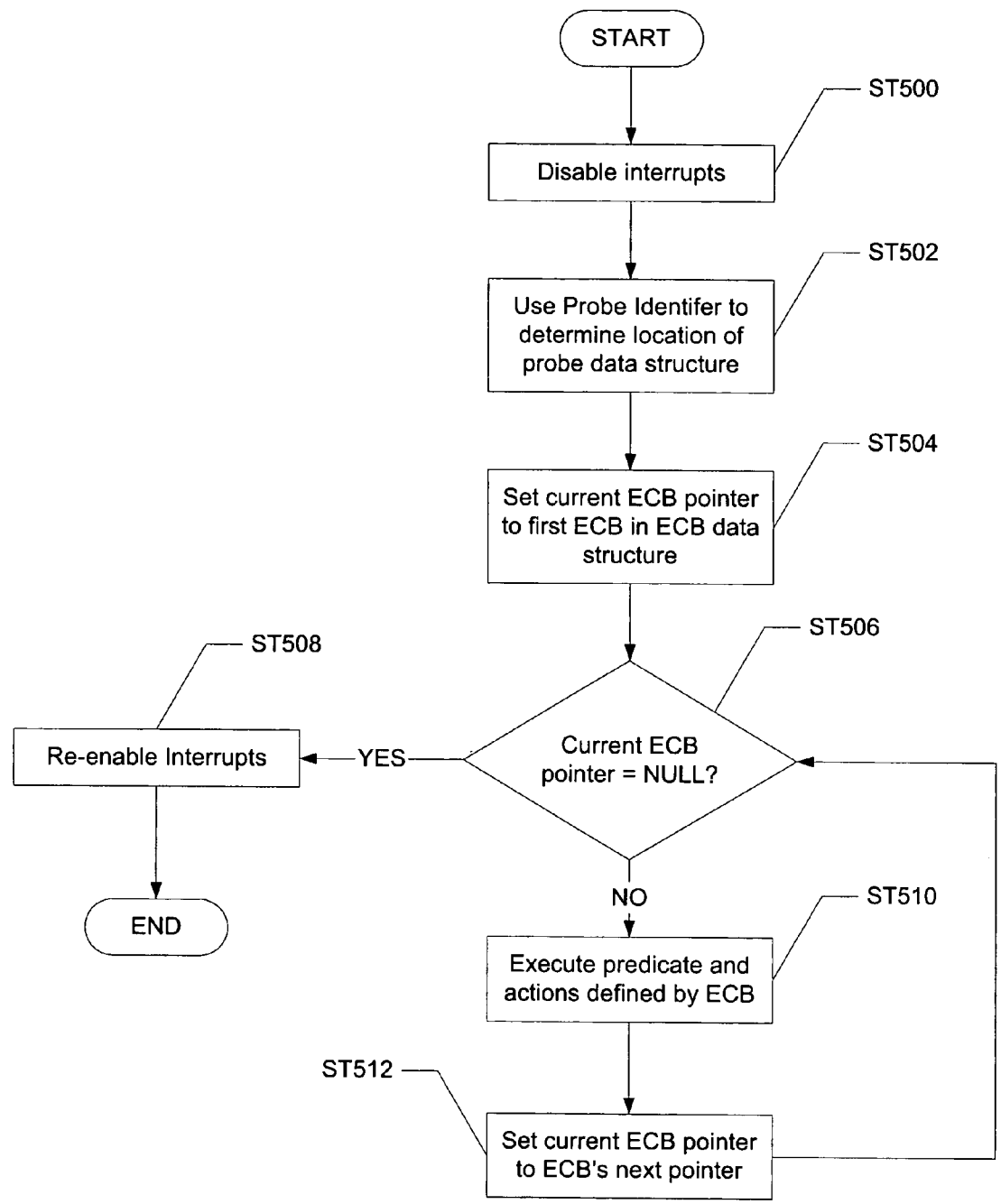
FIG. 5 shows a flowchart in accordance with one embodiment of the invention.

FIG. 5 shows a flowchart in accordance with one embodiment of the invention. Specifically, FIG. 5 shows a flowchart detailing the operation of the tracing framework and the ECBs in accordance with one embodiment of the invention. Initially, the CPU upon which the probe (112, 114) is triggered (i.e., the probe (112,114) is encountered during the execution of the instrumented program (115)) disables interrupts (Step 500). The Probe Identifier associated with the probe (112, 114) is used as an index into the global array to obtain a pointer (402, 404, 406) to the associated probe data structures (i.e., the pointer (408) to the probe provider and the pointer (410) to the ECB data structures (412)) (Step 502). Using the information obtained for Step 502, a current ECB pointer (not shown) is set to the first ECB (414, 416, 418) in the ECB data structure (412) (Step 504). In one embodiment of the invention, the current ECB pointer is a data structure maintained by the tracing framework which points to the ECB that the tracing framework is currently executing.

If the value of the current ECB pointer is null (Step 506) (i.e., there is no ECB (414, 416, 418) associated with the particular probe (112, 114)), then the interrupts are re-enabled (Step 508) and the instrumented program (115) continues executing. If the current ECB pointer is not NULL (Step 506) (i.e., one or more ECBs (414, 416, 418) are defined for the particular probe (112, 114)), then the predicate (426, 428, 430) and the action (432, 434, 436) are performed, as specified by the ECB (414, 416, 418) (Step 510) and the resulting data set obtained from the execution is stored in the "Active" buffer. Once the ECB (414, 416, 418) has finished executing, the current ECB pointer is set to the ECB's pointer (438, 440, 442) to the next ECB (414, 416, 418) (Step 512). Steps 506-512 are repeated until the current ECB pointer equals NULL (i.e., the tracing framework (106) has executed all the ECBs (414, 416, 418) associated the particular probe (112, 114)).

FIG. 6 shows a flowchart in accordance with one embodiment of the invention. Specifically, FIG. 6 details one embodiment of performing Step 510 in FIG. 5. Prior to executing the action in the ECB, the tracing framework determines the consumer state associated with the ECB (Step 600). In one or more embodiments of the invention, the consumer state is determined by querying the consumer state component in (or associated with) the ECB. The consumer state is then used to determine a buffer pair (i.e., an "Active"/"Inactive" buffer pair) (Step 602). In one embodiment of the invention, the buffer pair associated with the consumer is derived by using a current CPU identifier to index into a per-consumer array of buffers. Those skilled in the art will appreciate that in the aforementioned embodiment, the consumer array of buffer is specified on a per-CPU basis.

Continuing with the discussion of FIG. 6, the tracing framework (or an associated process) then determines if there is sufficient space to store a data set corresponding to information to be obtained by executing the action associated with the ECB (Step 604). In one embodiment of the invention, the presence of sufficient space is determined by evaluating whether the free data pointer of the "Active" buffer plus the size of the data set is greater than the buffer size. If there is not sufficient space in the buffer, then the drop counter associated with the "Active" buffer is incremented (Step 606). Note that each buffer (i.e., the "Active" and the "Inactive" buffer may include a separate drop counter or, alternatively, each buffer pair may include only one drop counter which is associated with the particular buffer in the buffer pair that is currently denoted as "Active". Continuing with the discussion of FIG. 6, if there is sufficient space in the "Active" buffer, then the action defined within the ECB is performed (Step 608) and stored in the "Active" buffer (Step 610).

In one embodiment of the invention, the tracing framework periodically (i.e., at preset intervals) switches the "Active" buffer and the "Inactive" buffer in the buffer pair so that the data sets that were stored in the "Active" buffer may be copied out to a buffer, typically a user-level buffer, associated with the consumer. Alternatively, the tracing framework could monitor the drop counter associated with the "Active" buffer, and when the value of the drop counter reaches a threshold level, the tracing framework could switch the "Active" buffer and the "Inactive" buffer.

FIG. 7 shows a flowchart in accordance with one embodiment of the invention. Specifically, the flowchart details a method of switching the "Active" buffer and the "Inactive" buffer in a buffer pair in accordance with one embodiment of the invention. The result of switching the buffer pair is that the buffer that was "Inactive" prior to switching of the buffer pair is "Active" after the switching of the buffer pair, and the buffer that was "Active" prior to the switching of the buffer pair is "Inactive" after switching the buffer pair.

Continuing with the description of FIG. 7, initially a global lock is acquired (Step 700). A cross-call is subsequently issued to perform the switching procedure (Step 702). The cross-call is performed on the processor on which the buffer pair resides (or on the processor associated with buffer pair is associated with if the invention is implemented on a distributed system.) FIG. 8 shows a flowchart detailing the switching procedure in accordance with one embodiment of the invention. FIG. 8 is described below. Once the cross-call has been issued and the switching procedure has been performed, the "Inactive" buffer is copied to an associated buffer (i.e., a buffer, typically a user-level buffer, associated with the consumer) (Step 704). If a drop count is not equal to zero, then the drop count associated with the "Inactive" buffer is copied to the associated buffer (Step 706). The global lock is subsequently released (Step 708).

As noted above, FIG. 8 shows a flowchart detailing the switching procedure in accordance with one embodiment of the invention. Initially, the interrupts for the CPU on which the buffer resides are disabled (Step 800). The address of the "Active" buffer is then copied into a temporary variable (Step 802). In one embodiment, the temporary variable is located in the tracing framework. Continuing with the discussion of FIG. 8, the address of the "Active" buffer located in the data structure (e.g., an array in the tracing framework) maintaining the buffer locations (e.g., the "Active" buffer location and "Inactive" buffer location) is overwritten by the address of the "Inactive" buffer (Step 804). The address of the "Inactive" buffer located in the data structure maintaining the buffer locations is overwritten by the address of the "Active" buffer stored in the temporary variable (Step 806).

The drop counter is then associated with the "Active" buffer (i.e., the buffer that was previously "Inactive" but now denoted as "Active") (Step 808) and reset (810). The interrupts are subsequently re-enabled (Step 812).

Those skilled in the art will appreciate that while embodiments of the invention have been described with respect to a linked list, any data structure may be used to represent the various components of the invention. Further, the various components of the invention may be located on a single machine or distributed across two or more machines.

Because the aforementioned switching procedure executes on the CPU that is being switched, and because interrupts are disabled when a probe is triggered (see FIG. 5) and in the switching procedure, serialization is guaranteed between the per-CPU switching procedure and the actions performed by any ECB on the CPU performing the switching procedure. That is, the procedure for storing the actions denoted by the ECB will occur either before or after the procedure for switching the "Active" and "Inactive" buffers. The semantics of disabling interrupts guarantee that the two procedures (i.e., the switching procedure and the procedure that occurs when a probe is triggered, see e.g., FIG. 5) cannot interleave. Thus, the invention provides the desired serialization for lossless buffer switching, without using synchronization primitives and without limiting the contexts that may be instrumented by the tracing framework. Accordingly, the operating system's facility for acquiring synchronization primitives and the operating system's scheduler may be instrumented. In addition, the invention provides a scalable means to execute a switching procedure.

Figure 9:
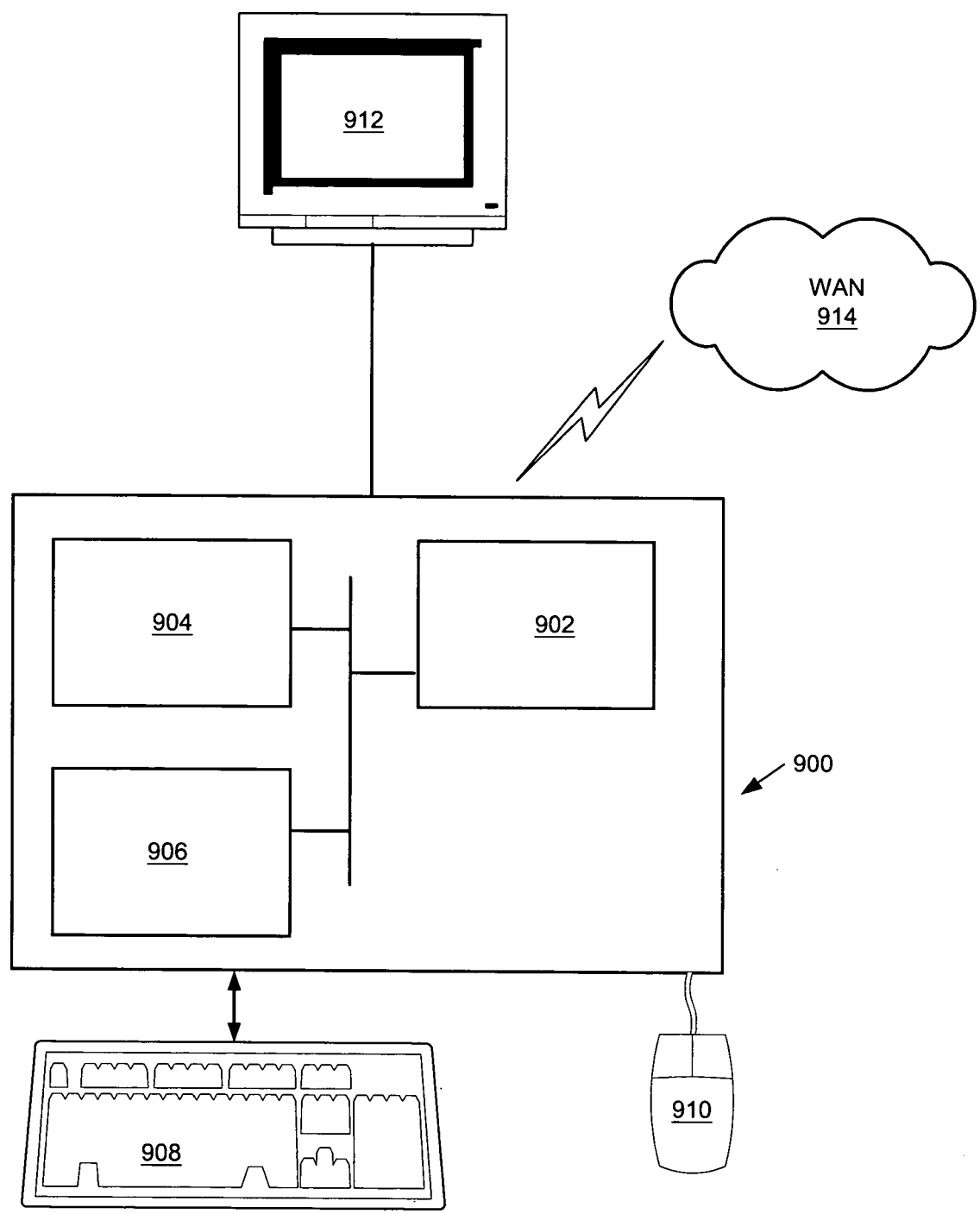
FIG. 9 shows a networked computer system in accordance with one embodiment of the invention.

The invention may be implemented on virtually any type of computer regardless of the platform being used. For example, as shown in FIG. 9, a typical networked computer system (900) includes a processor (902), associated memory (904), a storage device (906), and numerous other elements and functionalities typical of today's computers (not shown). The networked computer (900) may also include input means, such as a keyboard (908) and a mouse (910), and output means, such as a monitor (912). The networked computer system (900) is connected to a local area network (LAN) or a wide area network (914) (e.g., the Internet) via a network interface connection (not shown). Those skilled in the art will appreciate that these input and output means may take other forms. Those skilled in the art will appreciate that one or more elements of the aforementioned computer (900) may be located at a remote location and connected to the other elements over a network.

Further, those skilled in the art will appreciate that the aforementioned components (e.g., the buffers (116A, 116B), etc.) described above may operate on one node in a network, or be distributed across a series of nodes in the network. Further, embodiments of the invention may be implemented using one or more instances of each component within a given system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracing on a processor comprising:
   executing an execution control block on the processor to obtain data, wherein an interrupt on the processor is disabled prior to executing the execution control block and the interrupt is enabled after execution of the execution control block is completed;
   storing the data in a first buffer, wherein the first buffer is set to active; and
   setting the first buffer to inactive and setting a second buffer to active, wherein the interrupt on the processor is disabled prior to switching the first buffer to inactive and the interrupt is enabling after setting the second buffer to active,
   wherein executing the execution control block to obtain data and switching an active status between the first buffer and the second buffer are mutually exclusively performed using the processor,
   wherein the execution control block comprises an enabled probe identification identifying an action defining the data to be obtained from a probe in an instrumented program, and
   wherein a stored data set size is determined during buffering using the enabled probe identification.

2. The method of claim 1, further comprising:
   triggering the probe in the instrumented program; and
   determining the execution control block associated with the probe.

3. The method of claim 2, further comprising:
   associating the probe with a probe identifier.

4. The method of claim 3, wherein the determining the execution control block associated with the probe comprises querying a global array.

5. The method of claim 4, wherein the probe identifier is used to query the global array.

6. A method of claim 3, further comprising:
   associating the execution control block to the probe identifier.

7. The method of claim 1, wherein the execution control block further comprises:
   a predicate defining criterion for executing the execution control block; and
   a consumer state component defining information associated with a consumer.

8. The method of claim 5, wherein the execution control block is an element in a linked list.

9. The method of claim 6, wherein the execution control block further comprises:
   a pointer to a next execution control block.

10. The method of claim 7, wherein the first buffer and the second buffer are associated with the consumer.

11. The method of claim 10, wherein switching the first buffer to inactive and setting the second buffer to active comprises:
    searching for the first buffer and the second buffer associated with the consumer using the consumer state component.

12. The method of claim 1, wherein setting the first buffer to inactive and setting the second buffer to active occurs at a preset interval.

13. A system for tracing, comprising:
    a processor;
    a first buffer associated with the processor, wherein the first buffer is set to active;
    a second buffer associated with the processor, wherein the second buffer is set to inactive;
    an execution control block comprising an enabled probe identification identifying an action defining data to be obtained from a probe in an instrumented program, wherein an interrupt on the processor is disabled prior to executing the execution control block and the interrupt on the processor is enabled after execution of the execution control block is completed; and
    a tracing framework configured to store the data in the first buffer and configured to set the first buffer to inactive and the second buffer to active, wherein the tracing framework is configured to issue a cross-call prior to setting the first buffer to inactive and the second buffer to active,
    wherein executing the execution control block on the processor to obtain data and switching an active status between the first buffer and the second buffer are mutually exclusively performed using the processor, and
    wherein a stored data set size is determined during buffering using the enabled probe identification.

14. The system of claim 13, further comprising;
    a consumer associated with the first buffer and the second buffer.

15. The system of claim 13, wherein the cross-call comprises disabling an interrupt on the processor prior to setting the first buffer to inactive and enabling the interrupt after setting the second buffer to active.

16. The system of claim 13, wherein the tracing framework is configured to disable an interrupt prior to obtaining data from the probe and enable the interrupt after obtaining data from the probe.

17. The system of claim 13, wherein the execution control block further comprises:
    a predicate defining criterion for executing the execution control block; and
    a consumer state component defining information associated with a consumer.

18. The system of claim 17, wherein the tracing framework is configured to obtain the execution control block using the consumer state component.

19. The system of claim 13, wherein the first buffer comprises a drop count.

20. A network system having a plurality of nodes, comprising:
    a processor;
    a first buffer associated with the processor, wherein the first buffer is set to active;
    a second buffer associated with the processor, wherein the second buffer is set to inactive;
    an execution control block comprising an enabled probe identification identifying an action defining data to be obtained from a probe in an instrument program, wherein an interrupt on the processor is disabled prior to executing the execution control block and the interrupt on the processor is enabled after execution of the execution control block is completed; and
    a tracing framework configured to store the data in the first buffer and configured to set the first buffer to inactive and the second buffer to active, wherein the tracing framework is configured to issue a cross-call prior to setting the first buffer to inactive and the second buffer to active,
    wherein executing the execution control block on the processor to obtain data and switching an active status between the first buffer and the second buffer are mutually exclusively performed using the processor, wherein a stored data set size is determined during buffering using the enabled probe identification, wherein the processor executes on any node of the plurality of nodes, wherein the first buffer executes on any of the plurality of nodes, wherein the second buffer executes on any of the plurality of nodes, wherein the execution control block executes on any of the plurality of nodes, and wherein the tracing framework executes on any of the plurality of nodes.

21. The network system of claim 20, wherein the cross-call comprises disabling an interrupt on the processor prior to setting the first buffer to inactive and enabling the interrupt after setting the second buffer to active.

22. The network system of claim 20, wherein the execution control block further comprises:
  a predicate defining criterion for executing the execution control block; and
  a consumer state component defining information associated with a consumer.

* * * * *